United States Patent
Nishida

(12) United States Patent (10) Patent No.: US 7,504,805 B2
Nishida (45) Date of Patent: Mar. 17, 2009

(54) BOOST CIRCUIT

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 329 days.

(21) Appl. No.: 11/546,803

(22) Filed: Oct. 11, 2006

(65) Prior Publication Data

US 2007/0085515 A1 Apr. 19, 2007

(30) Foreign Application Priority Data

Oct. 13, 2005 (JP) ............................. 2005-298950

(51) Int. Cl.
*G05F 1/00* (2006.01)
(52) U.S. Cl. ..................................... 323/222
(58) Field of Classification Search ................ 323/222, 323/224, 225
See application file for complete search history.

(56) References Cited

U.S. PATENT DOCUMENTS 6,525,513 B1 * 2/2003 Zhao .......................... 323/222

FOREIGN PATENT DOCUMENTS

JP 2004-120901 4/2004

* cited by examiner

*Primary Examiner*—Shawn Riley
(74) *Attorney, Agent, or Firm*—Cooper & Dunham, LLP

(57) ABSTRACT

This patent specification describes a boost circuit which includes an inductor wired to an input terminal, a switching device connected between the inductor and a ground, a rectifying device formed of a MOS transistor and connected between the inductor and an output terminal and configured to be switched in accordance with the control signal, a first transistor wired to the input terminal and to a substrate gate of the rectifying device, a second transistor wired to the substrate gate of the rectifying device and to the output terminal and a controller configured to control each operation of the switching device, the rectifying device and the first and second transistors so that the first transistor is off and the second transistor is on in a boost mode and the first transistor is on and the second transistor is off in a boost suspend mode.

18 Claims, 6 Drawing Sheets

BOOST CIRCUIT

TECHNICAL FIELD

The present disclosure relates to a boot circuit, and more particularly to a boot circuit capable of effectively supplying power with compact size.

BACKGROUND

Recently, energy-saving has been actively promoted in terms of environmental measure. For portable equipments using battery such as a mobile phone, a digital camera and so on, it is especially important to have a longer battery life. Such portable equipment commonly uses a constant voltage circuit which supplies a low voltage power. The constant voltage circuit generally includes a boost circuit to obtain the low voltage power with a full voltage range.

FIG. 1 illustrates a conventional boost circuit. The conventional boost circuit 100 includes an inductor L101, a switching device M101 and a diode D101. The switching device M101 is formed of a NMOS (n-type metal oxide semiconductor) transistor and is connected between an input terminal IN and a ground through the inductor L101. The diode D101 works as a rectifying device and is connected between a node at which the inductor L101 is wired with the switching device M101 and an output terminal OUT.

In this conventional boost circuit, electric energy is stored in the inductor L101 while the switching device M101 is on. When the switching device M101 is off, the electric energy stored in the inductor L101 is output by being added with an input voltage Vin. However, a power conversion efficiency of this conventional boost circuit is not high because there is a relatively large voltage drop at the diode D101.

FIG. 2 illustrates another conventional boost circuit 200. The boost circuit 200 employs a PMOS (p-type metal oxide semiconductor) transistor M102 as a rectifying device instead of the diode D101. The switching device M101 and the PMOS transistor M102 are switched to be on and off complementarily. A voltage drop of the PMOS transistor M102 is relatively small when the PMOS transistor M102 is on in comparison to the voltage drop of the diode D101 in FIG. 1. As a result, the power conversion efficiency is much improved using the PMOS transistor M102 as the rectifying device.

A substrate gate of the PMOS transistor M102 is wired to a node of the output terminal side of the PMOS transistor M102. The parasitic diode D102 is formed between a node of the inductor L101 side of the PMOS transistor M102 and the substrate gate of the PMOS transistor M102. An anode of the parasitic diode D102 is wired to the node of the inductor L101 side of the PMOS transistor M102, and a cathode of the parasitic diode D102 is wired to the node of the output terminal OUT side of the PMOS transistor M102.

In a suspend mode of the boost circuits, the input voltage Vin is output through the diode D101 in the boost circuit 100 of FIG. 1. And the input voltage Vin is output to the output terminal OUT through the parasitic diode D102 in the boost circuit 200 of FIG. 2. Thus, The power is continuously being supplied and cannot be stopped even if the boost circuit is suspended.

FIG. 3 illustrates another conventional boost circuit 300. The boost circuit 300 includes two rectifying devices M112 and M113. Each rectifying device M112 and M113 includes parasitic diode D112 and D113. A pair of the rectifying device and parasitic diode are wired in series so that polarities of the pair of the rectifying device and parasitic diode are arranged in reverse direction from each other as shown in FIG. 3. The switching device M111, the rectifying devices M112 and M113 are set to be off by a control circuit 113 in accordance with a feedback signal from an overload detector which detects an overload condition and a protection circuit. As a result, an input voltage Vin is prevented from being output to the output terminal OUT.

However, the boost circuit 300 needs two larger rectifying devices because a large overload current flows through the rectifying devices. As a result, there is a cost penalty due to a necessity of large devices in size when the circuit is fabricated onto an IC (integrated circuit). Further, a power conversion efficiency is decreased in the boost circuit 300 because of a voltage drop at the rectifying devices M112 and M113 which is twice larger than the other boost circuits such as the boost circuit 200.

SUMMARY

This patent specification describes a novel boost circuit which, in one exemplary embodiment, includes an inductor wired to an input terminal, a switching device connected between the inductor and a ground, a rectifying device connected between the inductor and an output terminal and switched in accordance with a control signal, a first transistor wired to the input terminal and to a substrate gate of the rectifying device, a second transistor wired to the substrate gate of the rectifying device and to the output terminal, and a controller which controls each operation of the switching device, the rectifying device and the first and second transistors so that the first transistor is off and the second transistor is on in a boost mode and the first transistor is on and the second transistor is off in a boost suspend mode.

This patent specification further describes another exemplary embodiment of a novel boost circuit which includes an inductor wired to an input terminal, a switching device connected between the inductor and a ground and configured to be switched in accordance with a control signal input at a control terminal, a rectifying device connected between the inductor and an output terminal and configured to be switched in accordance with the control signal input at the control terminal, a first transistor wired to the input terminal at an end, a second transistor wired to the output terminal at an end, and a controller which controls each operation of the switching device and the rectifying device. Other ends and gates and substrate gates of the first and second transistors and a substrate gate of the rectifying device are wired.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
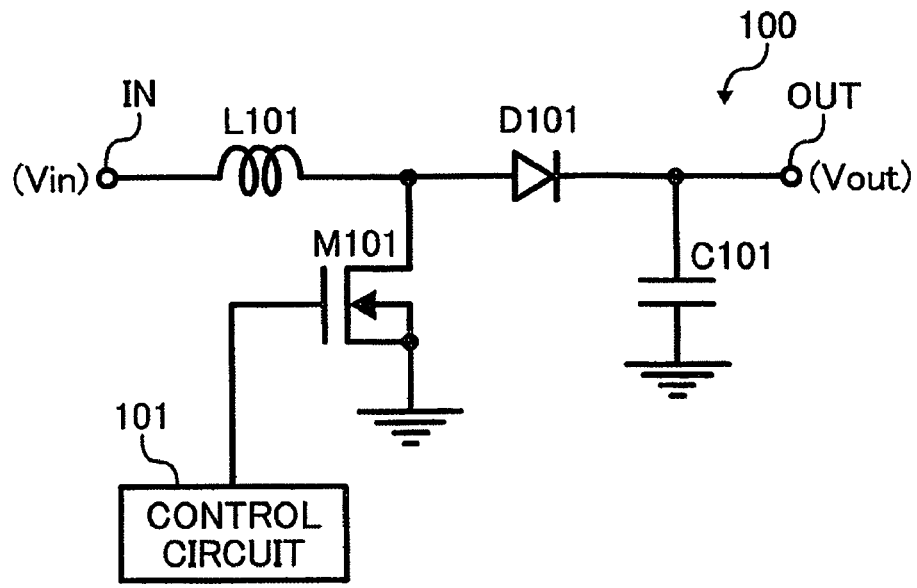
FIG. 1 illustrates a conventional boost circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 4, a boost circuit according to exemplary embodiments are described.

Figure 4:
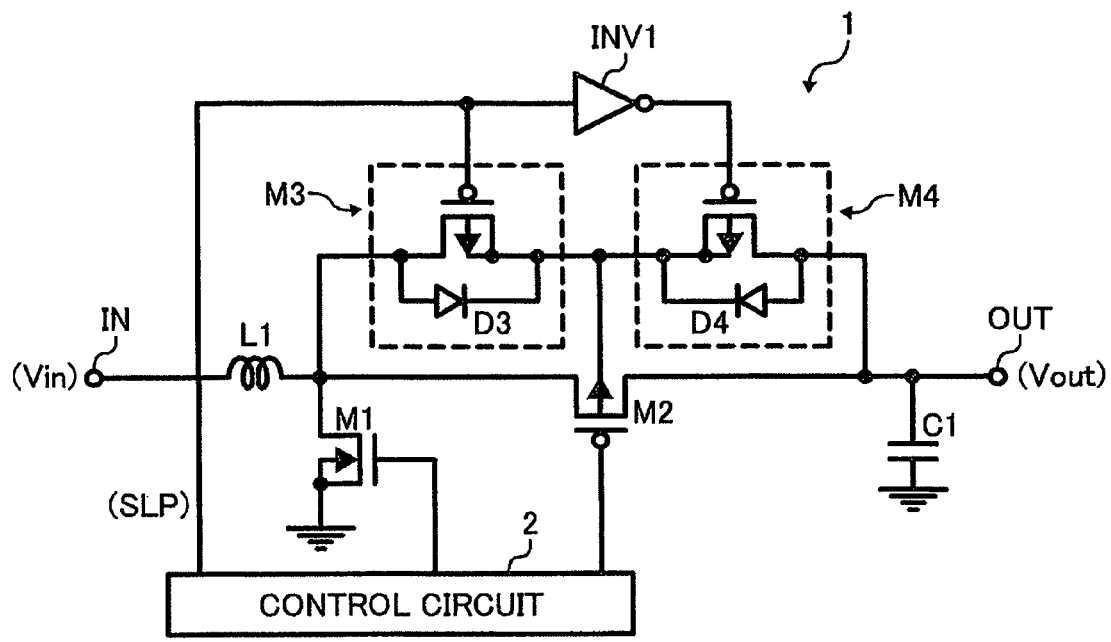
FIG. 4 illustrates a boost circuit according to a first exemplary embodiment of the present disclosure.

FIG. 4 illustrates a boost circuit 1 according to a first exemplary embodiment of the present disclosure. The boost circuit 1 boosts an input voltage Vin which is input from an input terminal IN and outputs an output voltage Vout from an output terminal OUT. The boost circuit 1 includes a switching device M1, a rectifying device M2, PMOS transistors M3 and M4, an inverter INV1, an inductor L1, a capacitor C1, a control circuit 2.

The switching device M1 is formed of a NMOS transistor and the rectifying device M2 is formed of a PMOS transistor. The control circuit 2 controls the switching device M1, the rectifying device M2 and the PMOS transistors M3 and M4. The PMOS transistor M3 forms a first MOS transistor. The PMOS transistor M4 forms a second MOS transistor. The control circuit 2 and the inverter INV1 form a control circuit unit. The switching device M1, the rectifying device M2, the PMOS transistors M3 and M4, the inverter INV1 and the control circuit 2 may be integrated onto an IC.

The inductor L1 and the rectifying device M2 are wired in series between the input terminal IN and the output terminal OUT. The capacitor C1 is wired between the output terminal OUT and a ground. The switching device M1 is wired between a node at which the inductor L1 is wired with the rectifying device M2 and the ground. Each gate of the switching device M1 and the rectifying device M2 is wired to the control circuit 2.

A substrate gate of the switching device M1 is wired to the ground. The PMOS transistors M3 and M4 are wired in series and form a serial circuit. The serial circuit is connected in parallel with the rectifying device M2. A sleep signal SLP from the control circuit 2 is input to a gate of the PMOS transistor M3 and to an input of the inverter INV1. Further, the sleep signal SLP is input to a gate of the PMOS transistor M4 through the inverter INV1.

The connecting node of the PMOS transistors M3 and M4 is wired to the substrate gate of the rectifying device M2. Substrate gates of PMOS transistors M3 and M4 are wired to the connecting node of the PMOS transistors M3 and M4. Accordingly, parasitic diodes D3 and D4 are formed in parallel with each corresponding PMOS transistor M3 and M4.

In this circuit configuration, the sleep signal SLP from the control circuit 2 is set to be a high level in a boost operation. The switching device M1 and the rectifying device M2 are controlled to be on and off complementarily. Meanwhile, the switching device M1 and the rectifying device M2 are both set to be off in a boost suspend operation.

Figure 5:
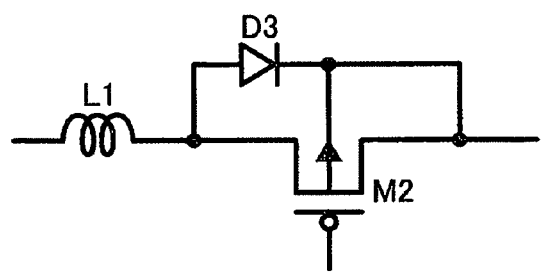
FIG. 5 illustrates an equivalent circuit representing a relevant part of the boost circuit of FIG. 4 at a boost operation.
Figure 6:
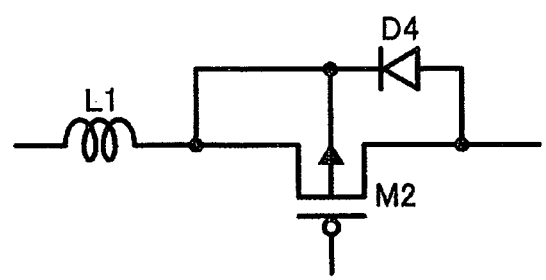
FIG. 6 illustrates an equivalent circuit representing a relevant part of the boost circuit of FIG. 4 at a boost suspend operation.

FIG. 5 illustrates an equivalent circuit representing a connection of the substrate gate of the rectifying device M2 and a connection of the parasitic diodes of the PMOS transistors M3 and M4 in a boost operation. FIG. 6 illustrates an equivalent circuit representing a connection of the substrate gate of the rectifying device M2 and a connection of the parasitic diodes of the PMOS transistors M3 and M4 in a boost suspend operation.

Figure 2:
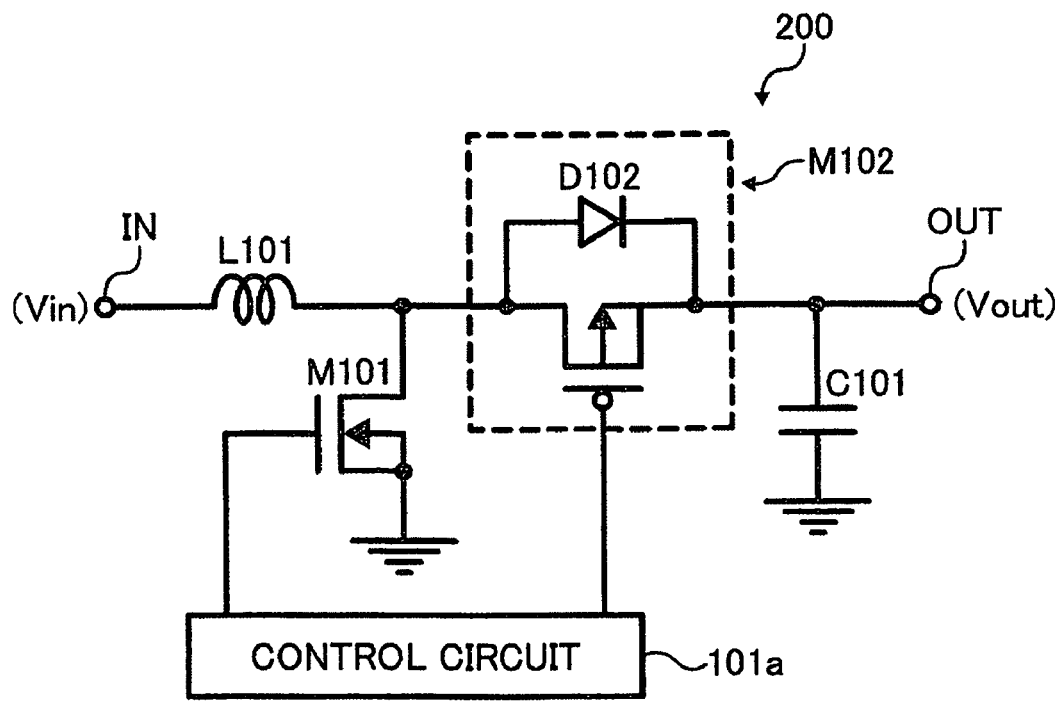
FIGS. 2 and 3 illustrate other conventional boost circuits.
Figure 3:
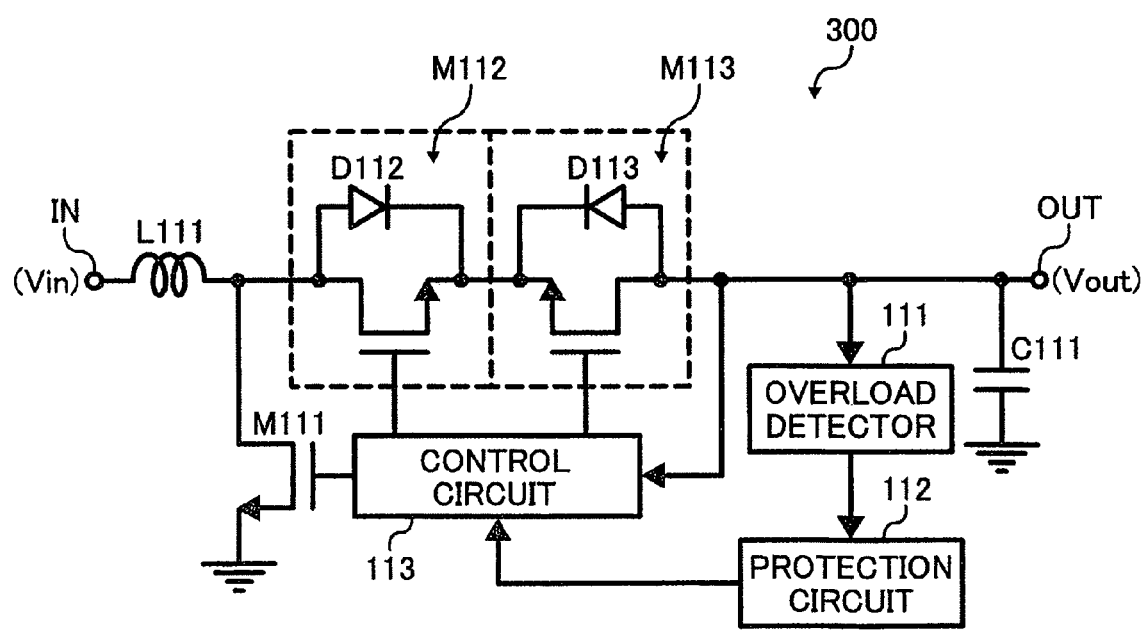

Referring to FIG. 5, the PMOS transistor M3 is off and the PMOS transistor M4 is on because the sleep signal SLP from the control circuit 2 is set to be a high level in a boost operation. The substrate gate of the rectifying device M2 is wired to the output terminal OUT. An anode of parasitic diode D3 is connected to a node of an interconnection of the inductor L1 and the rectifying device M2. A cathode is of parasitic diode D3 is connected to a node of substrate gate of the rectifying device M2. This is the same condition as the conventional boost circuit described with reference to FIG. 2.

Referring to FIG. 6, the PMOS transistor M3 is on and the PMOS transistor M4 is off because the sleep signal SLP from the control circuit 2 is set to be a low level in a boost suspend operation. A substrate gate of the rectifying device M2 is wired to the node of a connecting node of the inductor L1 and the rectifying device M2. An anode of parasitic diode D4 is wired to the output terminal OUT. A cathode of the parasitic diode D4 is wired to a node of a substrate gate of the rectifying device M2. As a result, the input voltage Vin cannot be output even if the voltage at the output terminal OUT is dropped.

Figure 7:
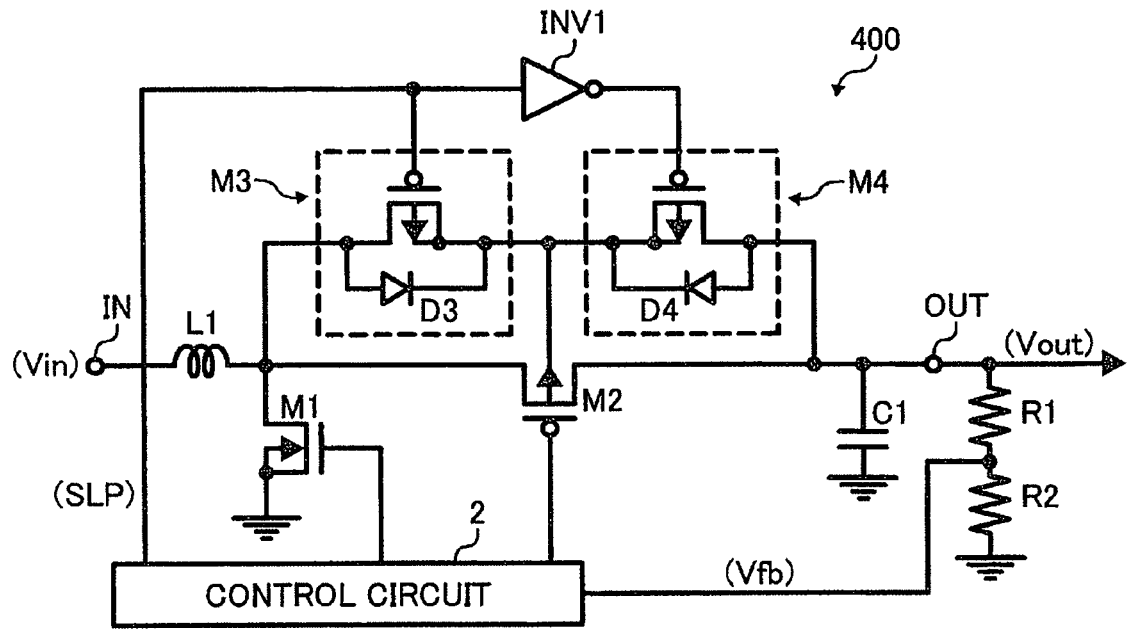
FIG. 7 illustrates a constant-voltage circuit which employs the boost circuit of FIG. 4.

FIG. 7 illustrates a constant-voltage circuit 400 which employs the boost circuit 1 of FIG. 4. The constant-voltage circuit 400 includes bleeder resistors R1 and R2. The bleeder resistors R1 and R2 generate a divided voltage Vfb of the output voltage Vout for detection of the output voltage Vout. The control circuit 2 controls the operation of the switching device M1 and the rectifying device M2 using, for example, a PWM (pulse width modulation) control circuit so that the Vfb is maintained to be a predetermined voltage Vref. Namely, the output voltage Vout is kept to be a predetermined constant voltage.

Figure 8:
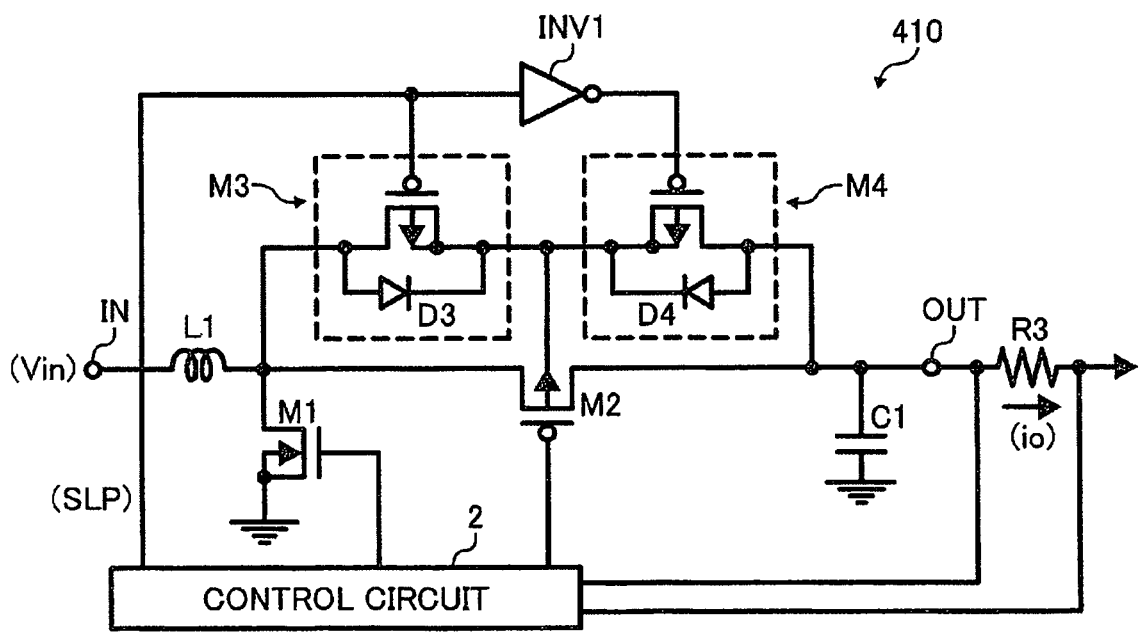
FIG. 8 illustrates a constant-current circuit which employs the boost circuit of FIG. 4.

FIG. 8 illustrates a constant-current circuit 410 which employs the boost circuit 1 of FIG. 4. The constant-current circuit 410 includes a resistor R3. The resistor R3 is connected in series before the output terminal OUT to convert an output current Io to a voltage signal. The output current Io flows towards the output terminal OUT through the rectifying device M2 and the resistor R3.

The voltage signal between the terminal ends of the resistor R3 is output to the control circuit 2. Similarly, the control circuit 2 controls the operation of the switching device M1 and the rectifying device M2 using, for example, the PWM control circuit so that the voltage signal at the terminal ends of the resistor R3 is maintained to be a predetermined voltage Vref. Namely, the output current Io is kept to be a predetermined constant current.

Figure 9:
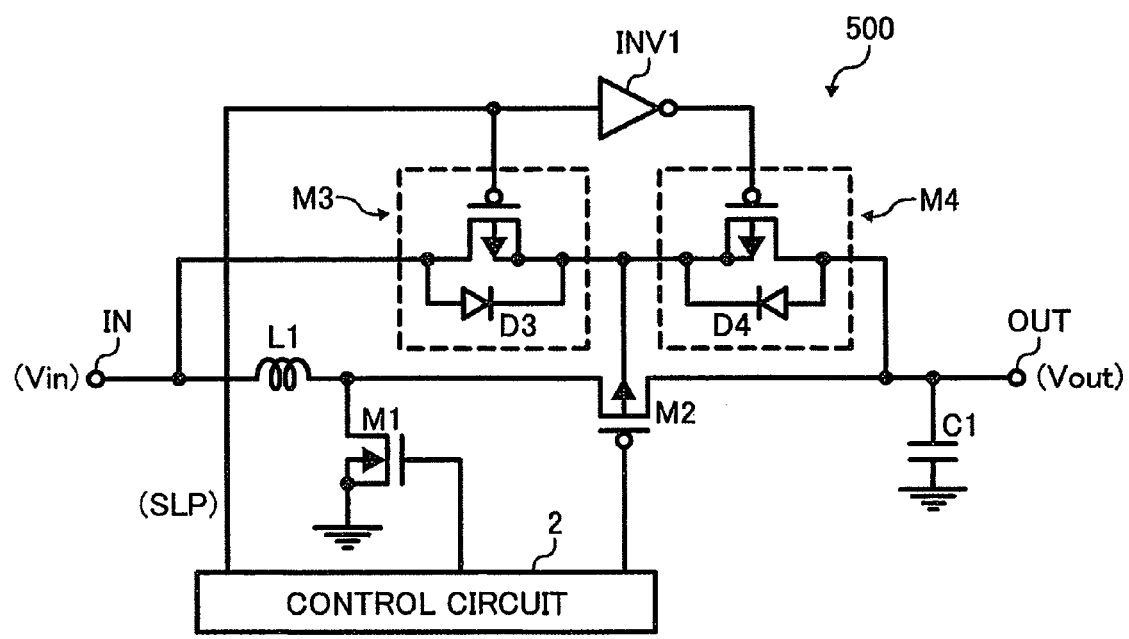
FIG. 9 illustrates another example of a boost circuit.

FIG. 9 illustrates another example of a boost circuit 500. In FIGS. 4, 7 and 8, the PMOS transistor M3 is wired to the node at which the inductor L1 is wired to the switching device M1 and the rectifying device M2. In the boost circuit 500, however, the PMOS transistor M3 may be connected to the input terminal IN as shown in FIG. 9.

In the boost circuits according to the first exemplary embodiment, the PMOS transistor M3 is set to be on and the PMOS transistor M4 is set to be off in the boost suspend mode. The substrate gate of the rectifying device M2 is wired to the node of the connecting node of the inductor L1 and the rectifying device M2 as shown in FIG. 6. Further, the anode of the parasitic diode D4 is wired to the output terminal OUT and the cathode of the parasitic diode D4 is wired to the substrate gate of the rectifying device M2. Therefore, it can be avoided that the input voltage Vin is output to the output terminal OUT even if the output voltage is dropped.

As a result, the PMOS transistors M3 and M4 can be formed with relatively small size because there is little current flow in the PMOS transistors M3 and M4, and it is easily achieved to obtain an integrated circuit with a relatively small size. It is possible to prevent the input voltage Vin from outputting to the output terminal OUT without affecting the power conversion efficiency and without adding a large device.

Figure 10:
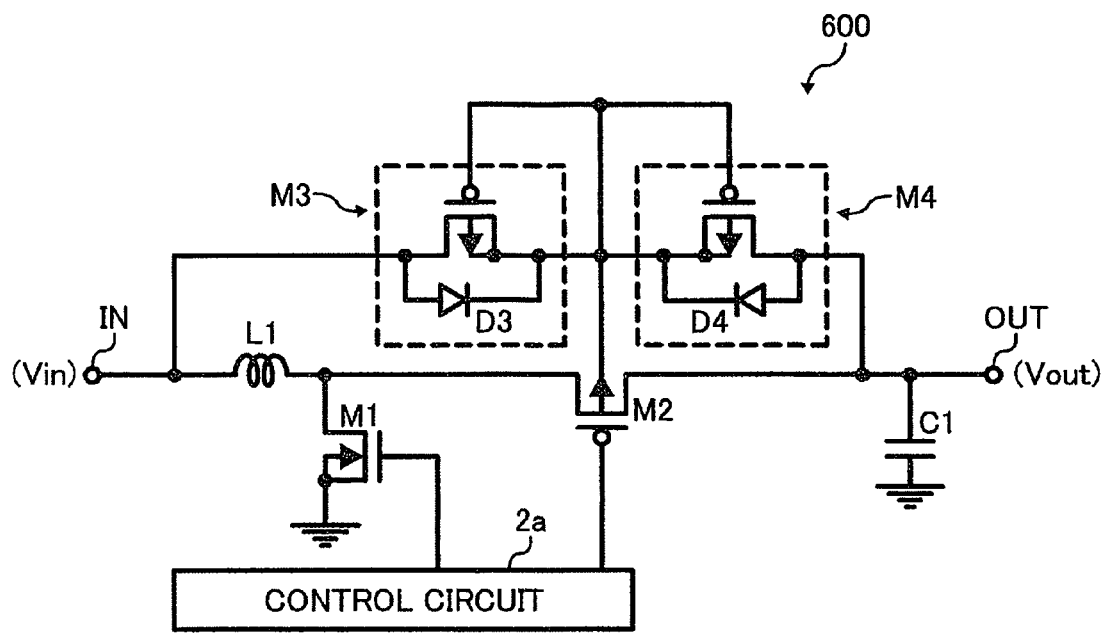
FIG. 10 illustrates a boost circuit according to a second exemplary embodiment of the present disclosure.

FIG. 10 illustrates a boost circuit 600 according to a second exemplary embodiment of the present disclosure. The boost circuit 600 boosts an input voltage Vin which is input from an input terminal IN and outputs an output voltage Vout from an output terminal OUT. The boost circuit 600 includes a switching device M1, a rectifying device M2, PMOS transistors M3 and M4, an inductor L1, a capacitor C1 and a control circuit 2a.

The switching device M1 is formed of a NMOS transistor and the rectifying device M2 is formed of a PMOS transistor. The control circuit 2a controls the switching device M1 and the rectifying device M2. The control circuit 2a forms a control circuit unit. The switching device M1, the rectifying device M2, the PMOS transistors M3 and M4, the inverter INV1 and the control circuit 2a may be integrated into an IC.

The inductor L1 and the rectifying device M2 are connected in series between the input terminal IN and the output terminal OUT. The capacitor C1 is connected between the output terminal OUT and a ground. The switching device M1 is connected between a node at which the inductor L1 is wired with the rectifying device M2 and the ground. Each gate of the switching device M1 and the rectifying device M2 is wired to the control circuit 2a.

A substrate gate of the switching device M1 is wired to the ground. The PMOS transistors M3 and M4 are connected in series and form a serial circuit. Gates of the PMOS transistors M3 and M4, the substrate gate of the rectifying device M2 and the substrate gates of the PMOS transistors M3 and M4 are wired to a connecting node of the PMOS transistors M3 and M4. Accordingly, parasitic diodes D3 and D4 are formed in parallel with the corresponding PMOS transistors M3 and M4. In this circuit configuration, a substrate gate voltage of the rectifying device M2 will be described.

In a boost mode, the output voltage Vout is applied to the substrate gate voltage of the rectifying device M2 through the parasitic diode D4 because the output voltage Vout is higher than the input voltage Vin. Meanwhile, in a boost mode, the input voltage Vin is applied to the substrate gate voltage of the rectifying device M2 through the parasitic diode D3 because the input voltage Vin is higher than the output voltage Vout. Namely, the highest voltage is applied to the substrate gate voltage of the rectifying device M2 in both cases. Each PMOS transistor M3 and M4 is off because each gate of the PMOS transistors M3 and M4 is wired to the substrate gate voltage of the rectifying device M2.

Figure 11:
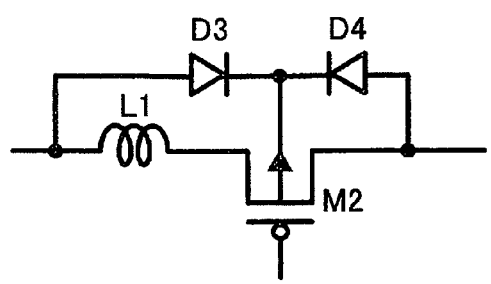
FIG. 11 illustrates an equivalent circuit around the rectifying device of FIG. 10.

FIG. 11 illustrates an equivalent circuit around the rectifying device M2 of FIG. 10. The parasitic diode D3 is connected between the substrate gate voltage of the rectifying device M2 and the input terminal IN. The parasitic diode D4 is connected between the substrate gate voltage of the rectifying device M2 and the output terminal OUT.

Both cathodes of the parasitic diodes D3 and D4 are wired to the substrate gate voltage of the rectifying device M2. Similar to the first exemplary embodiment, it is possible to prevent the current flowing from the input terminal IN to the output terminal OUT even when the boost operation is stopped by setting both switching device M1 and rectifying device M2 off.

Numerous additional modifications and variations are possible in light of the above teachings. It is therefore to be understood that within the scope of the appended claims, the disclosure of this patent specification may be practiced otherwise than as specifically described herein. For example, elements and/or features of different examples and illustrative embodiments may be combined with each other and/or substituted for each other within the scope of this disclosure and appended claims.

This patent specification is based on Japanese patent application, No. 2005-298950 filed on Oct. 13, 2005 in the Japan Patent Office, the entire contents of which are incorporated by reference herein.

What is claimed is:

1. A boost circuit comprising:
an inductor wired to an input terminal with a first end of the inductor;
a switching device connected between a second end of the inductor and a ground, and configured to be switched in accordance with a control signal input through a control terminal;
a rectifying device connected between the second end of the inductor and an output terminal and configured to be switched in accordance with the control signal input through the control terminal, the rectifying device being formed of a MOS transistor;
a first transistor wired to the input terminal with a first end of the first transistor and wired to a substrate gate of the rectifying device with a second end of the first transistor, and including a first parasitic diode, the first parasitic diode including a cathode wired to the substrate gate of the rectifying device;
a second transistor wired to the substrate gate of the rectifying device with a first end of the second transistor and wired to the output terminal with a second end of the second transistor, and including a second parasitic diode, the second parasitic diode including a cathode wired to the substrate gate of the rectifying device; and
a controller configured to control each operation of the switching device, the rectifying device and the first and second transistors so that the first transistor is off and the second transistor is on in a boost mode and the first transistor is on and the second transistor is off in a boost suspend mode.

2. The boost circuit of claim 1,
wherein the first end of the first transistor is wired to the input terminal through the inductor.

3. A boost circuit comprising:
an inductor wired to an input terminal with a first end of the inductor;
a switching device connected between a second end of the inductor and a ground, and configured to be switched in accordance with a control signal input through a control terminal;
a rectifying device connected between the second end of the inductor and an output terminal and configured to be switched in accordance with the control signal input through the control terminal, the rectifying device being formed of a MOS transistor;
a first transistor wired to the input terminal with a first end of the first transistor and wired to a substrate gate of the rectifying device with a second end and a gate of the first transistor, and including a first parasitic diode, the first parasitic diode including a cathode wired to the substrate gate of the rectifying device;

a second transistor wired to the substrate gate of the rectifying device with a first end and a gate of the second transistor and wired to the output terminal with a second end of the second transistor, and including a second parasitic diode, the second parasitic diode including a cathode wired to the substrate gate of the rectifying device; and a controller configured to control each operation of the switching device and the rectifying device.

4. The boost circuit of claim 1, wherein the first and second transistors are PMOS transistors.

5. The boost circuit of claim 4, wherein the substrate gates of the first and second transistors are wired to the substrate gate of the rectifying device.

6. The boost circuit of claim 1, wherein the switching device, the rectifying device, the first and second transistors and the controller are integrated in an IC.

7. A constant voltage circuit which employs the boost circuit of claim 1.

8. The constant voltage circuit of claim 7, wherein the first end of the first transistor is wired to the input terminal through the inductor.

9. A constant voltage circuit which employs the boost circuit of claim 3.

10. The constant voltage circuit of claim 7, wherein the first and second transistors are PMOS transistors.

11. The constant voltage circuit of claim 10, wherein the substrate gates of the first and second transistors are wired to the substrate gate of the rectifying device.

12. The constant voltage circuit of claim 7, wherein the switching device, the rectifying device, the first and second transistors and the controller are integrated in an IC.

13. A constant current circuit which employs the boost circuit of claim 1.

14. The constant current circuit of claim 13, wherein the first end of the first transistor is wired to the input terminal through the inductor.

15. A constant current circuit which employs the boost circuit of claim 3.

16. The constant current circuit of claim 13, wherein the first and second transistors are PMOS transistors.

17. The constant current circuit of claim 16, wherein the substrate gates of the first and second transistors are wired to the substrate gate of the rectifying device.

18. The constant current circuit of claim 13, wherein the switching device, the rectifying device, the first and second transistors and the controller are integrated in an IC.

* * * * *